Aug. 11, 1925.
G. F. WILSON
AUTOMOBILE THEFT GUARD
Filed Aug. 18, 1923
1,549,242
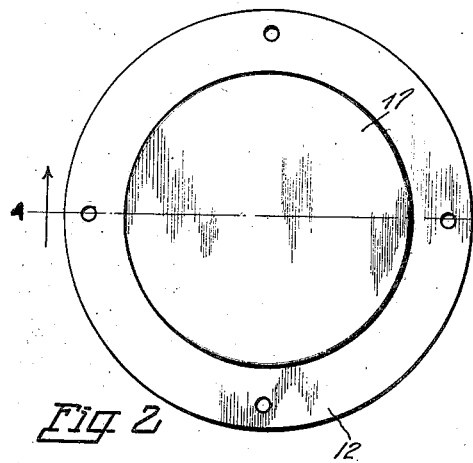
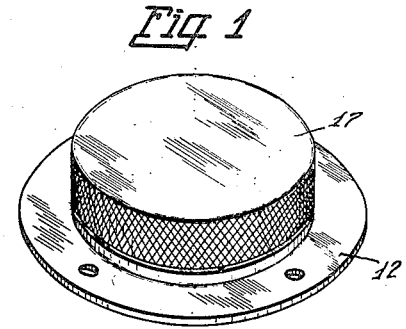
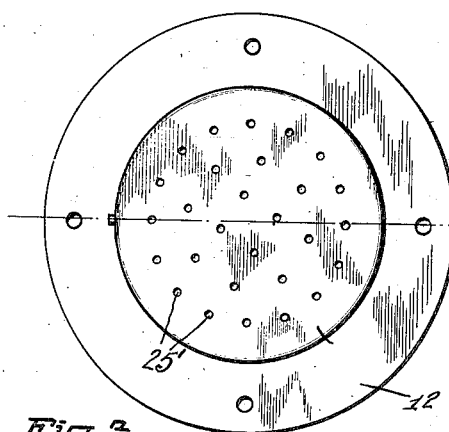
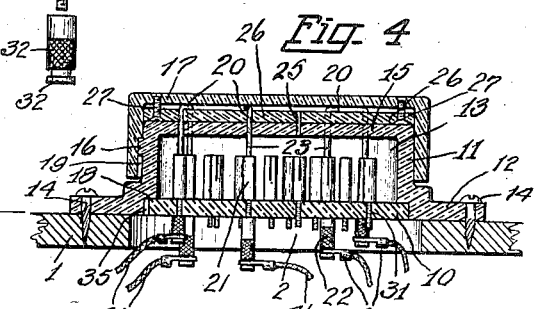
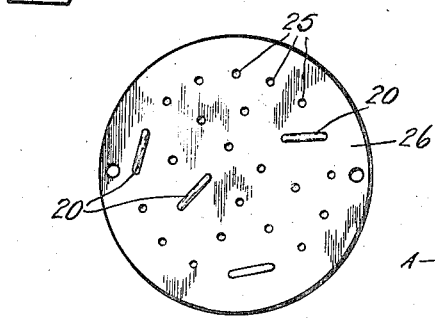
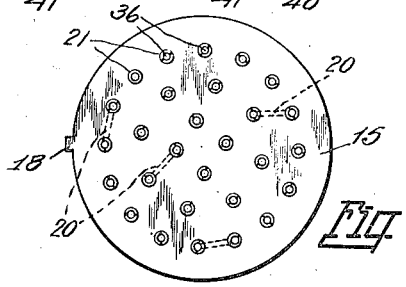
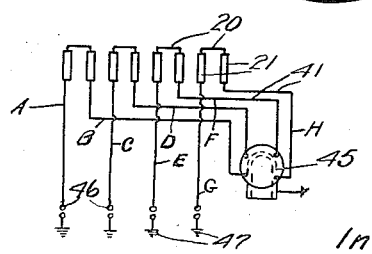
Inventor:
George F. Wilson,
Attorney, Patented Aug. 11, 1925.

1,549,242

UNITED STATES PATENT OFFICE.

GEORGE FREDERICK WILSON, OF PORTLAND, OREGON.

AUTOMOBILE THEFT GUARD.

Application filed August 18, 1923. Serial No. 658,141.

*To all whom it may concern:*

Be it known that I, GEORGE FREDERICK WILSON, a citizen of the United States, residing at Portland, in the county of Multnomah and State of Oregon, have invented certain new and useful Improvements in Automobile Theft Guards, of which the following is a specification.

This invention relates to improvements in devices for safeguarding automobiles.

The object of my invention is the provision of simple, novel and efficient means in conjunction with the ignition circuits of an automobile to open said circuits when the automobile needs to be protected from theft and in such a thorough manner that the circuits may not be closed practically without destruction of the apparatus.

A further object of the invention is to provide means for predeterminately arranging and setting the terminal points of the openable circuits, which setting may be performed by and be known only to the owner of the car and wherein the readjustment of the combination may be made readily when desired.

It is the province of my invention to improve generally the class of devices to which my invention appertains, and further objects and advantages residing therein will be apparent in the course of the following description.

The invention consists in the novel construction, adaptation and combination of the parts and devices comprising my improved auto safeguarding device, as will be fully described in the following specification, illustrated in the accompanying drawings, and finally pointed out in the appended claim.

In the accompanying drawings:

Figure 1 is a perspective view of an embodiment of my invention, shown detached.

Fig. 2 is a top plan view of the same.

Fig. 3 is a top plan view of the same with the cover-cap removed.

Fig. 4 is a view in cross-section on line 4—4 of Fig. 2 showing the apparatus in operative position on an automobile dash-board.

Fig. 5 is a detached plan view of the casing-plate showing the socket-posts mounted therein.

Fig. 6 is a detached top plan view of the cover-plate showing the terminal connections mounted therein.

Fig. 7 is a diagrammatic view of the electrical circuits as affected by my invention.

Fig. 8 is a detached view in side elevation of the socket-post element of the invention together with a binding nut therefor.

Referring to said views, wherein similar characters of reference designate like parts in the several views, the reference numeral 1 indicates the dash-board of an automobile having an aperture 2 formed therein. A cylindrical casing 11 of insulating material is formed with a flange 12 whereat it may be secured to said dash-board by screws 14 to cover said aperture. Said casing is formed with an interior chamber 13 and an upper wall 15 formed with a plurality of relatively small holes 25' arranged in symmetrical order and arrangement and desirably so that all or nearly all of said holes are evenly spaced apart.

A circular insulating plate 10 is received in the lower end of said chamber 13 and is formed with a tongue 18 receivable in a slot 35 of said casing to ensure the uniform setting of said plate. Screw-threaded holes 31 of the approximate size and of the same number and arrangement as the holes 25' are formed in said plate.

Numeral 21 indicates a socket-post of cylindrical configuration having an axially arranged split socket 36 extending for a distance into said post from the upper end. Each said post is formed with a reduced screw-threaded shank 30 at its lower end adapted to be screwed into and extend beyond said holes 31 from the upper side and below said plate 10 said shanks are engaged by binding-nuts 32 to admit of connection with certain of said posts of terminal clips 40 of any suitable design making electrical connection with the circuit wires of the ignition system indicated in Fig. 4 by numerals 41.

A cover-cap 17 adapted to slip over said casing is formed with a slot 19 to receive a projection 16 of said casing to ensure the proper placing of the cap thereon. A plate 26 is arranged to be inserted within said cap and is removably secured therein by screws 27. Plate 26 is likewise formed with holes 25 of the approximate size and of the same number and arrangement as holes 25'. Previous to securing said plate 26 in the cap the U-shaped connecting members 20 have their ends 23 inserted through certain of said holes in such order that they will correspond to and interfit with the posts 21 to which the pairs of current wires 41 are connected and when the cap is placed in operative position upon the casing the ends 23 will enter the respective sockets 36 and thus close the several circuits of the ignition system.

Referring to Fig. 7, illustrating in diagram the arrangement and relation of my improved devices to the ignition system of a four-cylinder motor, the wires A—B, C—D, E—F and G—H indicate the circuits, respectively, including the timing device 45 and the respective spark-plugs 46 suitably grounded, as at 47.

When the device is installed and at any time thereafter the circuit wires 41 are attached as described to the nuts 32 which are secured to the stems 30 of posts 21 positioned in adjacent holes in any predetermined arrangement. The connecting members 20 are placed in operative positions in the plate 26 to enter the sockets 36 to make an electrical connection closing the respective circuits, as has been described. When the automobile is not in use the cap 17 is readily removed and the car is thus safeguarded to a great extent against theft as the motor is not operative until said circuits are re-established. With the cap removed it would be difficult for an unauthorized person to see within the chamber 13 and owing to the number of posts 21 therein all of the same appearance and most of which are idle it would be extremely unlikely amounting to a negligible chance if he was able to join up the matching terminals of the circuits. Furthermore, the owner of the car can change the combination of posts to which the circuit wires are connected and very readily by changing the locations of the binding-nuts 32 and making a corresponding change in the positions of the U-shaped connections 20.

Having described my invention, what I claim, is :—

A theft-guard for automobiles, consisting in combination with the circuit wires of an ignition system, of a casing having a chamber therein and formed with a plurality of holes in its top wall arranged in symmetrical, evenly spaced relation, a plate secured within said casing formed with similarly arranged holes as those in said casing, a plurality of socketed posts seated in the holes of said plate in said chamber, binding-nuts adapted to be secured to said posts to make connection with said circuit wires, respectively, a removable cap arranged to be mounted on said casing, a plate secured within said cap formed with holes in the same arrangement as the holes in said casing, and a plurality of U-shaped connecting members secured in said cap-plate and adapted to close the circuits of the ignition system.

Signed at Portland, Oregon, this 7th day of June, 1923.

GEORGE FREDERICK WILSON.